United States Patent
Angerer et al.

(10) Patent No.: US 10,430,326 B2
(45) Date of Patent: *Oct. 1, 2019

(54) PRECISION DATA ACCESS USING DIFFERENTIAL DATA

(71) Applicant: International Business Machines Corporation, Armonk, NY (US)

(72) Inventors: Christoph M. Angerer, Zurich (CH); Heiner Giefers, Langnau am Albis (CH); Raphael Polig, Dietikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,960

(22) Filed: Dec. 21, 2016

(65) Prior Publication Data

US 2017/0097883 A1     Apr. 6, 2017

Related U.S. Application Data

(63) Continuation of application No. 14/968,718, filed on Dec. 14, 2015.

(30) Foreign Application Priority Data

Dec. 15, 2014   (GB) .................................. 1422246.7

(51) Int. Cl.
*G06F 12/02* (2006.01)
*G06F 7/38* (2006.01)
*G06F 3/06* (2006.01)

(52) U.S. Cl.
CPC .............. *G06F 12/02* (2013.01); *G06F 3/064* (2013.01); *G06F 3/0604* (2013.01); *G06F 3/0679* (2013.01); *G06F 7/38* (2013.01); *G06F 2207/382* (2013.01); *G06F 2212/72* (2013.01)

(58) Field of Classification Search
CPC ............................... G06F 9/30014; G06F 7/14
See application file for complete search history.

(56) References Cited

U.S. PATENT DOCUMENTS

| | | | |
|---|---|---|---|
| 5,341,506 A | 8/1994 | Nohmi et al. | |
| 5,559,969 A * | 9/1996 | Jennings | G06F 13/4018 710/307 |
| 5,729,724 A | 3/1998 | Sharangpani et al. | |
| 6,170,001 B1 | 1/2001 | Hinds et al. | |
| 6,253,299 B1 | 6/2001 | Smith et al. | |
| 7,500,043 B2 | 3/2009 | Wood | |

(Continued)

OTHER PUBLICATIONS

Examination Report under Section 18(3), Application No, GB1422246. 7, dated Jun. 29, 2016, 2 pages.

(Continued)

*Primary Examiner* — Ann J Lo
*Assistant Examiner* — Michelle L Taeuber
(74) *Attorney, Agent, or Firm* — Mark Bergner

(57) ABSTRACT

Differential data access. A method for storing and reading data elements to and from a memory is provided. The method includes storing a data element as a base word in a first precision, storing at least one delta word including additional information related to a second precision version of the stored data element, and reading the base word and the at least one delta word of the stored data element to access the data element in the second precision.

20 Claims, 9 Drawing Sheets

(56) References Cited

U.S. PATENT DOCUMENTS

| | | | |
|---|---|---|---|
| 2006/0004942 A1* | 1/2006 | Hetherington | G06F 9/3802 711/3 |
| 2006/0242213 A1* | 10/2006 | Wood | G06F 9/30036 708/160 |
| 2009/0049274 A1* | 2/2009 | Norman | G06F 12/06 711/219 |
| 2009/0198758 A1* | 8/2009 | Barowski | G06F 7/49994 708/626 |
| 2011/0004644 A1 | 1/2011 | Henry et al. | |
| 2016/0140079 A1* | 5/2016 | Kravitz | G06F 9/30014 712/22 |
| 2016/0170652 A1 | 6/2016 | Angerer et al. | |

OTHER PUBLICATIONS

Patents Act 1977: Search Report under Section 17, Application No. GB1422246.7, dated Jun. 2, 2015, 1 page.

Patents Act 1977: Patents Rules 2007, Notification of Grant: Patent Serial No. GB2533292, Application No. GB1422246.7, dated Oct. 4, 2016, 2 pages.

Angerer et al., "Differential Data Access", Application No. 1422246.7, Filed Dec. 15, 2014, 29 pages.

List of IBM Patents or Patent Applications Treated as Related, dated Dec. 20, 2016, pp. 1-2.

Goddeke et al., "Performance and Accuracy of Hardware-Oriented native-, emulated- and mixed-precision Solvers in FEM Simulations", International Journal of Parallel, Emergent, and Distributed Systems, vol. 22, Issue 4, Jan. 2007, 45 pages.

Chow, "Architecture Exploration for Parallel Computing Systems Transfer Report", Imperial College London Department of Computing, Sep. 4, 2008, 56 pages.

* cited by examiner

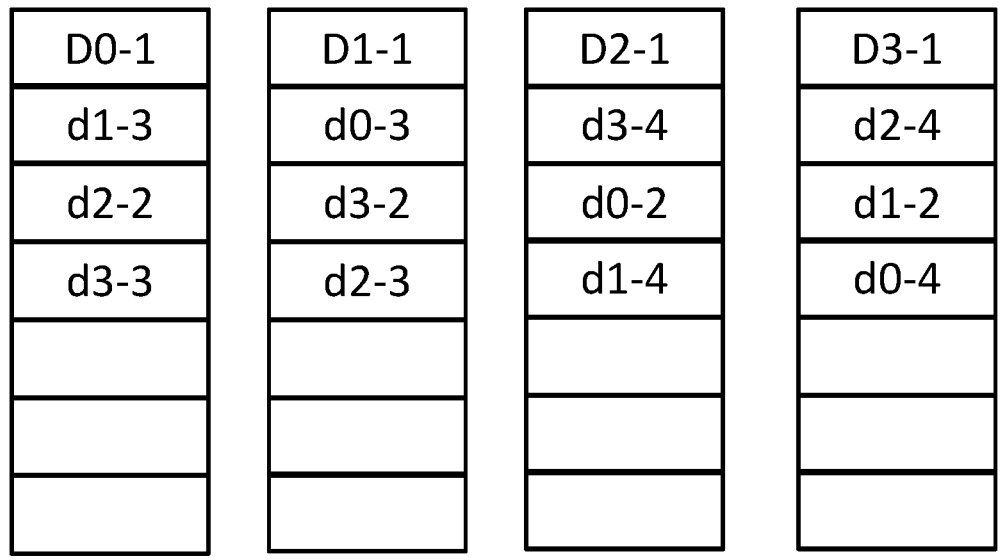
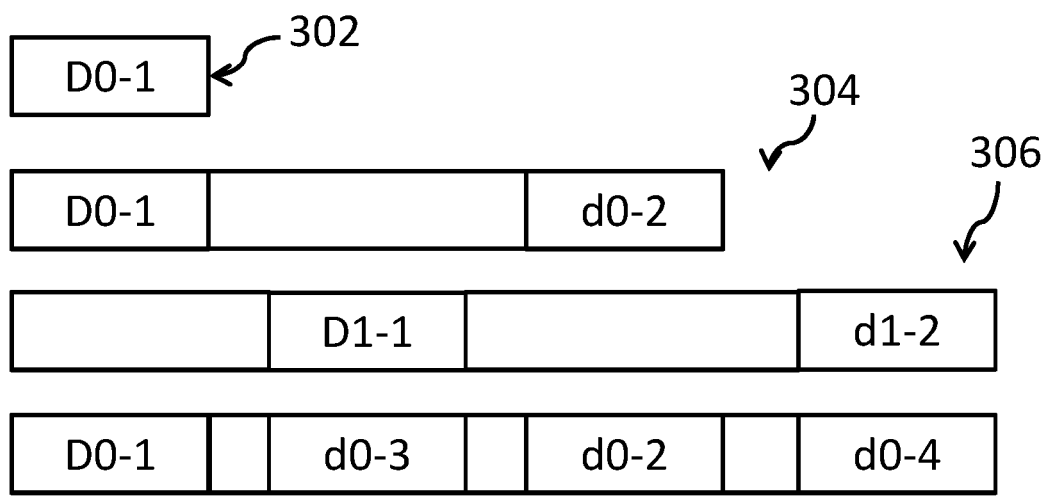
FIG. 3

PRECISION DATA ACCESS USING DIFFERENTIAL DATA

CROSS-REFERENCE TO RELATED APPLICATION

This application is a continuation of U.S. patent application Ser. No. 14/968,718, filed Dec. 14, 2015. This application also claims the benefit of priority to United Kingdom Patent Application No. 1422246.7, filed Dec. 15, 2014, the contents of which are incorporated herein by reference.

BACKGROUND

The invention relates generally to a method for storing and reading data elements to and from a memory. More particularly, the invention relates further to a related memory controller, a computing system, a data processing program, and a computer program product. In computer systems numeric values are represented as values with a defined precision. However, values with a higher precision require more memory space when they are stored, higher bandwidth for a movement from the memory to the processor of the computer system and in many cases also longer processing time if manipulated by the CPU (central processing unit). On the other side, it may not always be required to use the full precision of a variable. For example, for estimate calculations the variable in its lowest precision can be sufficient for a calculation of a good estimated result. In other cases, if the most accurate result possible can be required the variable can be used in its maximum precision available within the computer system, i.e., with a maximum number of bits. Thus, there can be a trade-off between computing speed, memory requirements and precision of a calculation. But at the same time, it may be a waste of memory resources to store every variable or data element in each precision available for potential calculations. Storing only the widest data words and potentially down-sizing it, can result in performance losses of the computer system.

There are several disclosures related to a method for storing and reading data elements to and from a memory in different precisions. One disclosure includes systems and methods for processing variable precision data using tags to identify the precision of digits within data words. One embodiment includes a processor having internal structures that are configured to present a variable precision data word as a variable number of digits, with each digit including a digital value and associated tags indicative of the digit's position within the data word.

Another discloses systems and methods for processing data using an array of data processing elements that are coupled together with a variable precision interconnect. One embodiment includes data processing elements coupled by variable precision interconnects to form a row-column array. However, there can be a need for memory space savings when handling variables with a variable precision which are instrumental in high processing speed.

SUMMARY

According to one aspect, a method for storing and reading data elements to and from a memory can be provided. The method can include storing a data element as a base word in a first precision, storing at least one delta word including additional information related to a second precision version of the stored data element, and reading the base word and the at least one delta word of the stored data element to access the data element in the second precision.

According to another aspect, a memory controller for storing and reading data elements to and from a memory can be provided. The memory controller can include a storage unit adapted for storing a data element as a base word in a first precision and for storing at least one delta word including additional information related to a second precision version of the stored data element and, an access unit adapted for reading the base word and the at least one delta word of the stored data element to access the data element in the second precision.

According to another aspect of the present invention there is non-transitory computer readable storage medium tangibly embodying a computer readable program code having computer readable instructions which, when implemented, cause a computer device to carry out the steps of a method for storing and reading data elements to and from a memory. The method includes: storing a data element as a base word in a first precision; storing at least one delta word comprising additional information related to a second precision version of the stored data element; and reading the base word and the at least one delta word of the stored data element to access the data element in the second precision.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent wherein:

FIG. 3 shows a block diagram of four numeric values with related delta words stored in different memory banks.

DETAILED DESCRIPTION

Figure 1:
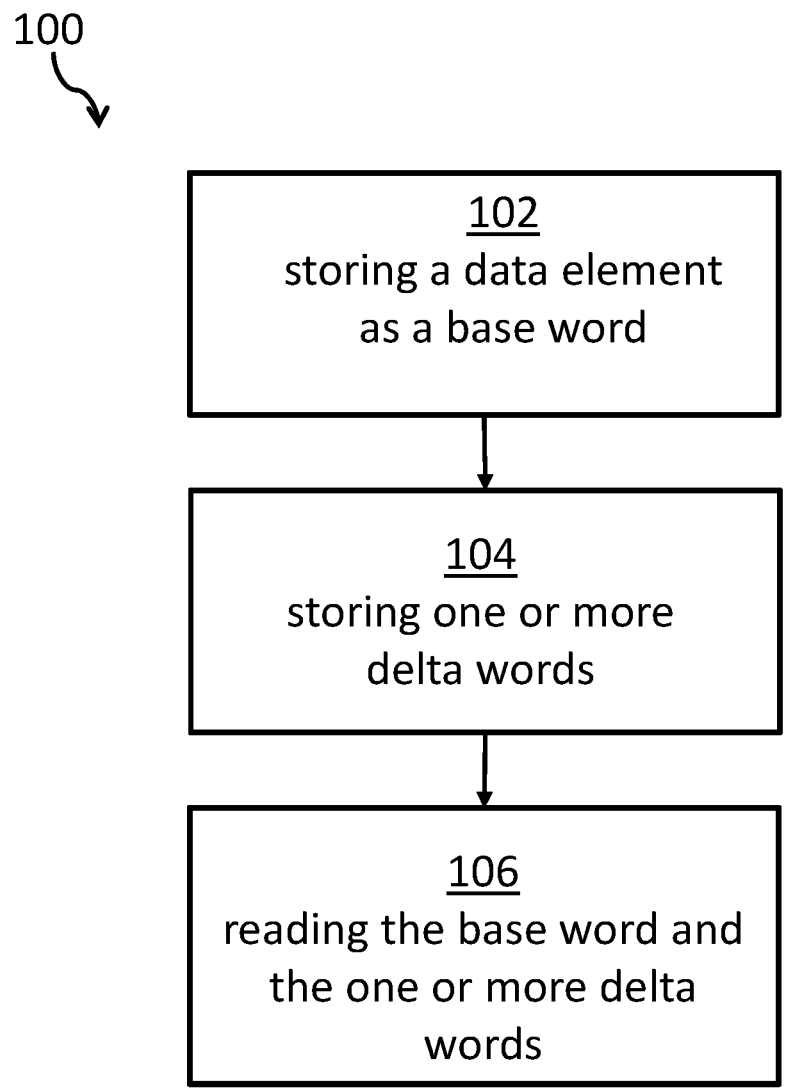
FIG. 1 shows a block diagram of an embodiment of the inventive method.

In the context of this description, the following conventions, terms and/or expressions can be used. The term "data element" can denote a numerical value, e.g., an integer value, a float value or a double value. Generally, any numeric value expressible by any programming language can be denoted a data element.

The term "memory" can denote, e.g., a main memory of a computer system. However, also a cache or a secondary memory can be denoted by the term "memory". The term "memory" can be used in a broad sense meaning that any storage components adapted for storing data can be used as a memory. That can not only be valid for any kind of RAM (random access memory) but also memristors (a memory element based on phase change resistors), cache memory of any kind, disk or tape storage or any other kind of storage elements for storing data values. The term "base word" can denote a word of a defined width, typically, the word width of a CPU (central processing unit) of a computer system. Typically, this can be defined by the register width of the related CPU.

The term "first precision" can denote an initial precision of a numeric data value. Generally, the precision of a numerical quantity can be a measure of the detail in which the quantity is expressed, e.g., in case of computers in number of bits. Integer values as well as float values maybe expressed by a different number of bits. A short integer value can include only eight bits. In the C programming language a "long double" can denote an extended precision floating-point data type. It can either be an 80-bit floating point format, the non-IEEE "double-double" or IEEE 754 quadruple-precision floating-point format if a higher precision format is provided.

The term "delta word" can denote an additional digital computer word including additional bits for a higher precision value of a related base value. If, e.g., a base word can have 32 bits in width a delta word can include an additional word giving 64 bits for the higher precision of the same numeric value. The term "second precision" can denote a higher precision of the same numeric value, as described in the context of first precision and base word. Obviously, the second precision requires more bits in a memory.

The term "memory bank" can denote a logical unit of storage. In a computer, the memory bank can be determined by the memory access controller along with a physical organization of the hardware memory slots. E.g., in a typical synchronous dynamic random-access memory (SDRAM) or double data rate synchronous dynamic random-access memory (DDR SDRAM), a bank can include of multiple rows and columns of storage units and can usually spread out across several chips. In a single read or write operation, only one bank can be accessed, therefore bits in a column or a row, per bank, per chip equal the memory bus width in bits in case of a single channel architecture. The size of a bank can further be determined by bits in a column and a row, per chip, times the number of chips in a bank. And, a parallel read of different banks can also be possible. The proposed method for storing and reading data elements to and from a memory can offer a couple of advantages:

Storing data elements of variables in a base precision, i.e., a base word and using differential data, i.e., delta words, can reduce the storage requirements to a lower amount than usual. However, it enables the computing system to access data elements at a required precision which allow a faster processing of the data element. Additionally, data transfers from the memory to the CPU can be executed in parallel because there are cases in which two data elements can be transferred in parallel over the data bus. The data element width needs only to be smaller or equal to half the width of the data bus or memory bus. According to one embodiment of the method, the first precision can be lower than the second precision. This can come as a sort of logical consequence because the second precision includes additional information about the numeric value which can be used to increase the number of bits of the numeric value and thus, the precision.

According to a further embodiment of the method, the data element can be accessed in a precision between the precision of the base word and the second precision if not all delta words of the at least one delta word can be read from the memory. The base word can have a plurality of additional words in order to increase the precision of the underlying numeric value. However, not in all cases all delta words can need to be read. If a base precision can be represented by a computer word, e.g., 32 bits, a higher or second precision can be represented by 4×32 bits which equals four computer words. However, a memory controller can access the numeric value using the base word plus one additional word or the base word plus two additional delta words. This technique can increase the number of bits available for a representation of the numeric value. However, the number of bits is now higher than the number of bits of the base word and lower than the number of bits with all available delta words. Thus, the precision of the numeric value can be in-between the precision of the base word and the second precision.

According to an enhanced embodiment of the method, the base word and each delta word from the at least one delta word can be stored in different memory banks. This means that all words, i.e., the base word and the delta word can be read in one computer, CPU, or memory cycle. That can speed up the operation of the CPU/memory combination. According to a comprehensive embodiment of the method, the at least one delta word can be added as least significant bits to the base word. Thus, a higher precision, e.g., the second precision, of the represented numeric value can be achieved straight forward without any significant additional computing.

According to another embodiment of the method, a first part of the delta words can be added as most significant bits to the base word and a second part of the delta words can be added as least significant bits. In a graphical representation this can be visualized in form of: one part of the delta word (or a complete delta word) can be added to the left side of the base word and another part (or another delta word) can be added on the right side of the base word. However, special attention can be paid to the sign bit which—in many cases—can be the most significant bit of a numeric value in its digital representation.

According to a further enhanced embodiment of the method, a data element can be stored in a third precision using a different number of delta words then used for the second precision. Thus, a plurality of precisions can be used with a different number of delta words giving high flexibility in storage requirements and computing speed. Furthermore, embodiments can take the form of a computer program product, accessible from a computer-usable or computer-readable medium providing program code for use, by or in connection with a computer or any instruction execution system. For the purpose of this description, a computer-usable or computer-readable medium can be any apparatus that can contain means for storing, communicating, propagating or transporting the program for use, by or in a connection with the instruction execution system, apparatus, or device.

The medium can be an electronic, magnetic, optical, electromagnetic, infrared or a semi-conductor system for a propagation medium. Examples of a computer-readable medium can include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited. In the following, a detailed description of the figures will be given. All instructions in the figures are schematic. Firstly, a block diagram of an embodiment of the inventive method for storing and reading data elements, to and from a memory, is given. Afterwards, further details of embodiments will be described.

FIG. 1 shows a block diagram of an embodiment of inventive method 100 for storing and reading data elements to and from a memory. The data elements can be numerical values, integer values or float values, etc. The method includes storing, 102 a data element as a base word in a first precision. One word can typically have the width of a CPU register or, the width of the data bus of the computer system. However, the data elements represented in the first precision can also use less bits than the width of registers or the data bus. In case of a 64-bit processor, it is possible to use the data element in a precision requiring only, e.g., eight bits. Thus, there may be no direct relationship between the processing width on the CPU or data bus and the first precision.

Method 100 can also include storing 104, at least one delta word including additional information related to a second precision version of the stored data element. The second precision can be higher than the first precision, i.e., requiring more bits. Typically, the second precision can require twice the number of bits required for the first precision or, three times as many bits as the first precision, and so on. However, it is not a requirement that the number of bits for the second precision is a plurality of the width of the data element in its first precision.

Moreover, method 100 can include reading 106, the base word and the at least one delta word of the stored data element to access the data element in the second precision. Thus, the data element can be accessible in the second precision. Alternatively, the data element can be accessible in its first precision, and it can also be possible to access the data element in a precision between the first precision and the second precision depending on how many bits of the data words can be accessed.

Figure 2:
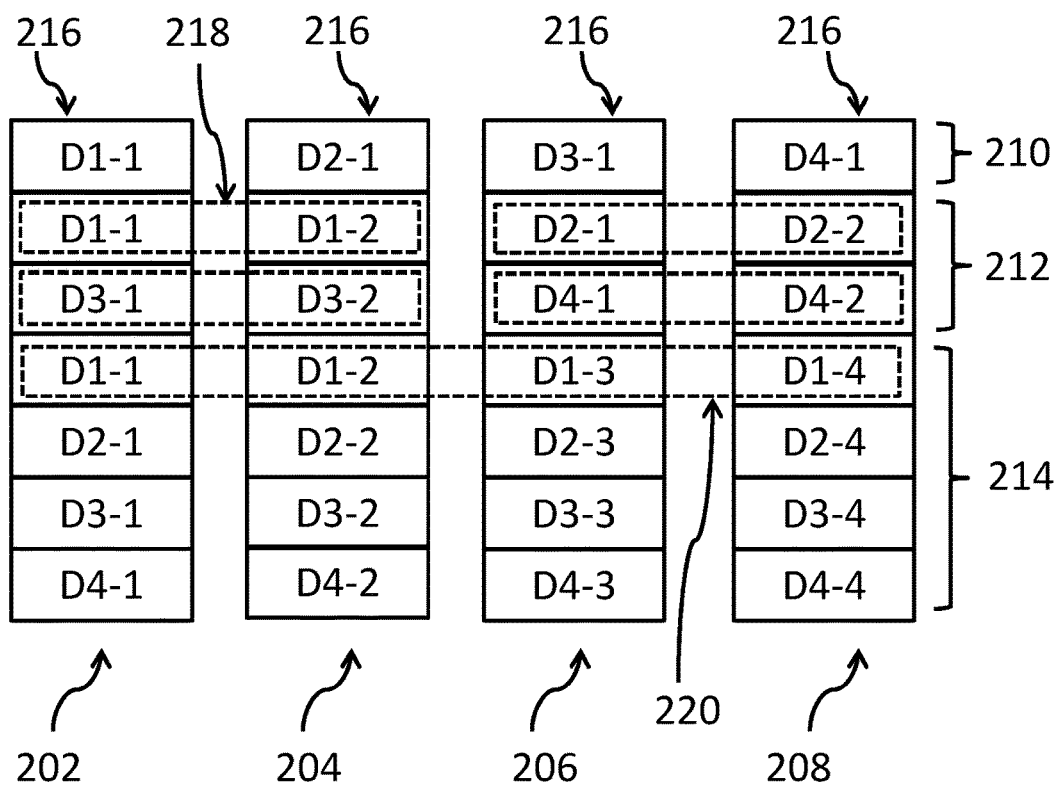
FIG. 2 shows a block diagram of numeric values stored in different precisions.

FIG. 2 shows a block diagram of numeric values stored in different precisions. The blocks 216 show elements D1-1, D2-1,D3-1,D4-1 of four data elements D1, D2, D3, D4 in its lowest precision, and as an example in one computer word; compare 210. Block 218 shows data element D1 in a second precision including the data words D1-1 and D1-2. The reader can recognize that also the variables D2, D3 and D4 are represented and stored as two words respectively: D2-1/D2-2, D3-1/D3-2, D4-1/D4-2, compare 212. Data elements in block 214, show the same data elements D1, . . . , D4 in the highest precision in this example. Each data element is represented as Dx-y, x=1, . . . , 4 and y=1, . . . 4, wherein x can represent the number of the data word, and wherein y can represent their respective data element, compare 220. Additionally, reference numerals 202, 204, 206 and 208 can represent four different memory banks, wherein each memory bank 202, 204, 206, 208 includes a stack of memory words. In this example, all data elements are stored in all potentially available precisions requiring a large amount of memory. This can be the case in conventional solutions.

FIG. 3 shows a block diagram of four numeric values D0-1, D1-1, D2-1, D3-1 with related delta words d0-2 bis d0-d4, d1-2 bis d1-4, d2-2 bis 2-4, d3-2 bis d3-4 stored in different memory banks 202, 204, 206, 208. Such an approach can require less memory as can easily be seen. For example, the variable D0 can be stored as a base word D0-1 in memory bank 202, a first delta word d1-2 in memory bank 206, a second delta word d0-3 in memory bank 204 and a third delta word d0-4 in memory bank 208. The other variables D1, D2 and D3 and their respective delta words are distributed between memory banks 202, 204, 206, 208 in an equivalent way. In the lower part of FIG. 3 it is shown how the data elements can be accessed with different precisions. Block 302 shows that D0 is accessed in its lowest precision as base word D0-1.

Block 304 shows that the variable D0 is accessed and a second precision including base word D0-1 and one delta word d0-2. It can be noticed that delta words start with a "d" while base words start with a "D". It can also be recognized that the representation of D0 in its second precision is stored in memory banks 202 and 206. The variable D1 is stored as base word D1-1 and delta word d1-2 in memory banks 204 and 208. Hence, both data elements can be read in one processor cycle because different memory banks can be accessed at the same time, i.e., during the same cycle, compare 304, 306.

In comparison, this may not be the case for the variables D1 and D3 in the example of FIG. 2. Here, the required delta words for a given precision including two delta words are stored in memory banks 202 and 204. Hence, two processor cycles may be required to access the two data elements. Referring back to FIG. 3, it can be recognized that every variables D0, . . . , D3 with their respective first delta words d0-2, d1-2, d2-2, d3-2 can be accessed during the same memory cycle because they are distributed among memory banks 202, . . . , 208. As a consequence, storing the data elements with a base word and at least one delta word requires less memory space and allows for a fast access, i.e., a lower number of processor cycles to access the data, e.g., in parallel. As a final example, FIG. 3 shows an access of the data element D0 in its highest precision by reading base word D0-1 and delta words d0-3, d0-2, d0-4 from memory banks 202, . . . , 208, compare 308.

Figure 4:
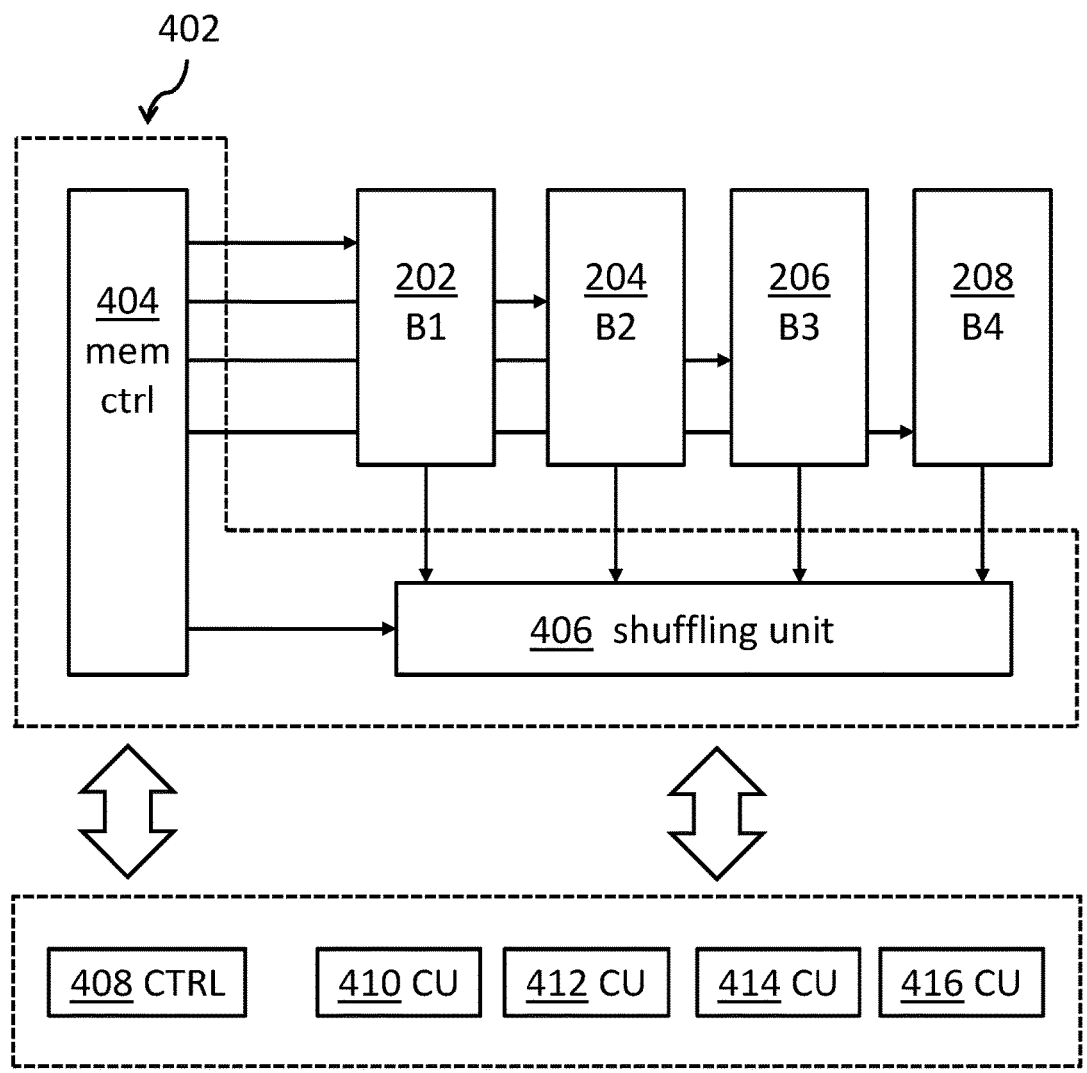
FIG. 4 shows an embodiment of a memory controller in the context of four memory banks.

FIG. 4 shows an embodiment of a memory controller 402 in the context of four memory banks B1, B2, B3, B4 with reference numerals 202, . . . , 208. Horizontal arrows indicate that a core memory controller 404 can access memory banks B1, . . . , B4. Additionally, a controller 408 and four computing units CU 410, 412, 414, 416 are shown. These computing units CU 410, 412, 414, 416 can work in parallel (multiprocessor system). The controller 408 can coordinate the cooperation between memory controller 404 and the shuffling unit 406. The computing units 410, . . . , 416 can each have a processing width of one word. However, in order to use conventional computing units, they need to be fed with bits for a data element in a conventional way. That means that the shuffling unit 406 needs to bring the stored base words and the respective delta words back into a conventional order. It can also be noted that the shuffling unit 406 is instrumental in splitting a conventional data element with a given precision in a base word and at least one potential delta word for a storage in memory banks 202, ..., 208. Together, the core memory controller 404 and the shuffling unit 406 can build the inventive memory controller 402.

Figure 5:
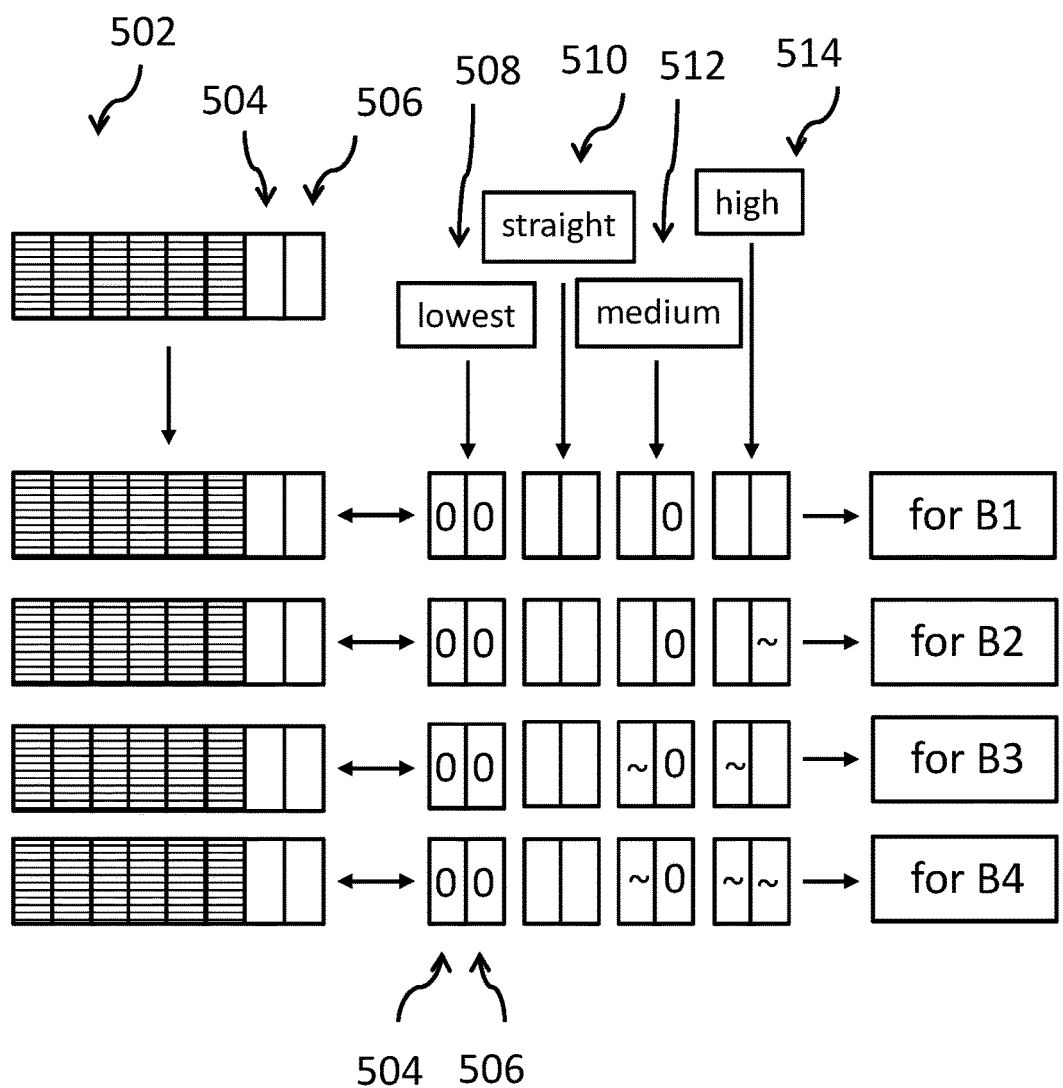
FIG. 5 shows an embodiment of addressing scheme.

FIG. 5 shows an embodiment of an exemplary addressing scheme of memory banks B1, ..., B4-202, ..., 208, respectively. 502 can represent eight input bits for addressing memory cells in 4 memory banks 202, ..., 208. 6 of the 8 bits—the 6 MSBs (most significant bits)—can be used for all memory banks 202, ..., 208. The last 2 bits 504, 506—so-called precision select/bank address bits—can be used to address the different memory banks 202, ..., 208 and differentiate between different precisions of stored delta words including a base word and at least one delta word. 4 different precisions are shown: lowest 508, straight 510, medium 512, high 514. The lowest precision includes only the base word. A straight precision includes the base word of the data element and one delta word, the medium precision includes the base word and two delta words, the highest precision requires the base word and three delta words. The "~"-sign stands for an inverted address bit of the respective address bit. For the lowest precision, the least significant bits (LSB) are not required because only the base word of the data element can be addressed. This is shown as "0" in the respective LSB bit fields. In some cases, inverted bits are required. And in the other cases the 2 LSBs 504, 506 of the 8 address bits 502 can be used in a 1:1 manner. This is shown in the matrix of 4 times 4 2-bit-cells. Only the left column has reference numerals 504 and 506 to indicate the 2 LSBs for the lowest precision. The right three columns for the straight 510, medium 512 and high 514 precision do—for clarity reasons of the figure—not have reference numerals. However, also for these banks address bits, the reference numerals 504 and 506 would be appropriate.

Figure 6:
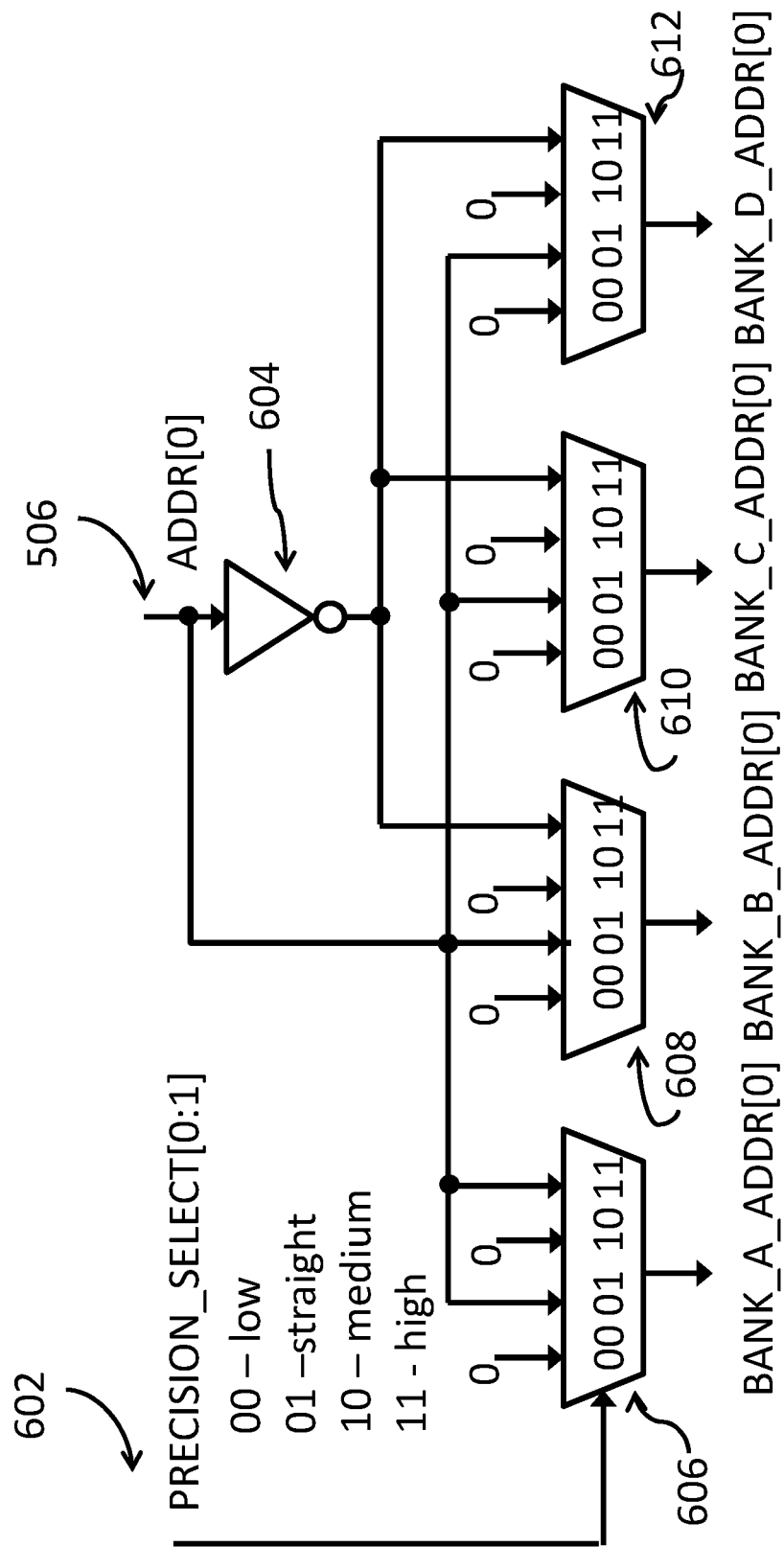
FIGS. 6 and 7 show embodiments of a digital implementation of the addressing schema of FIG. 5.
Figure 7:
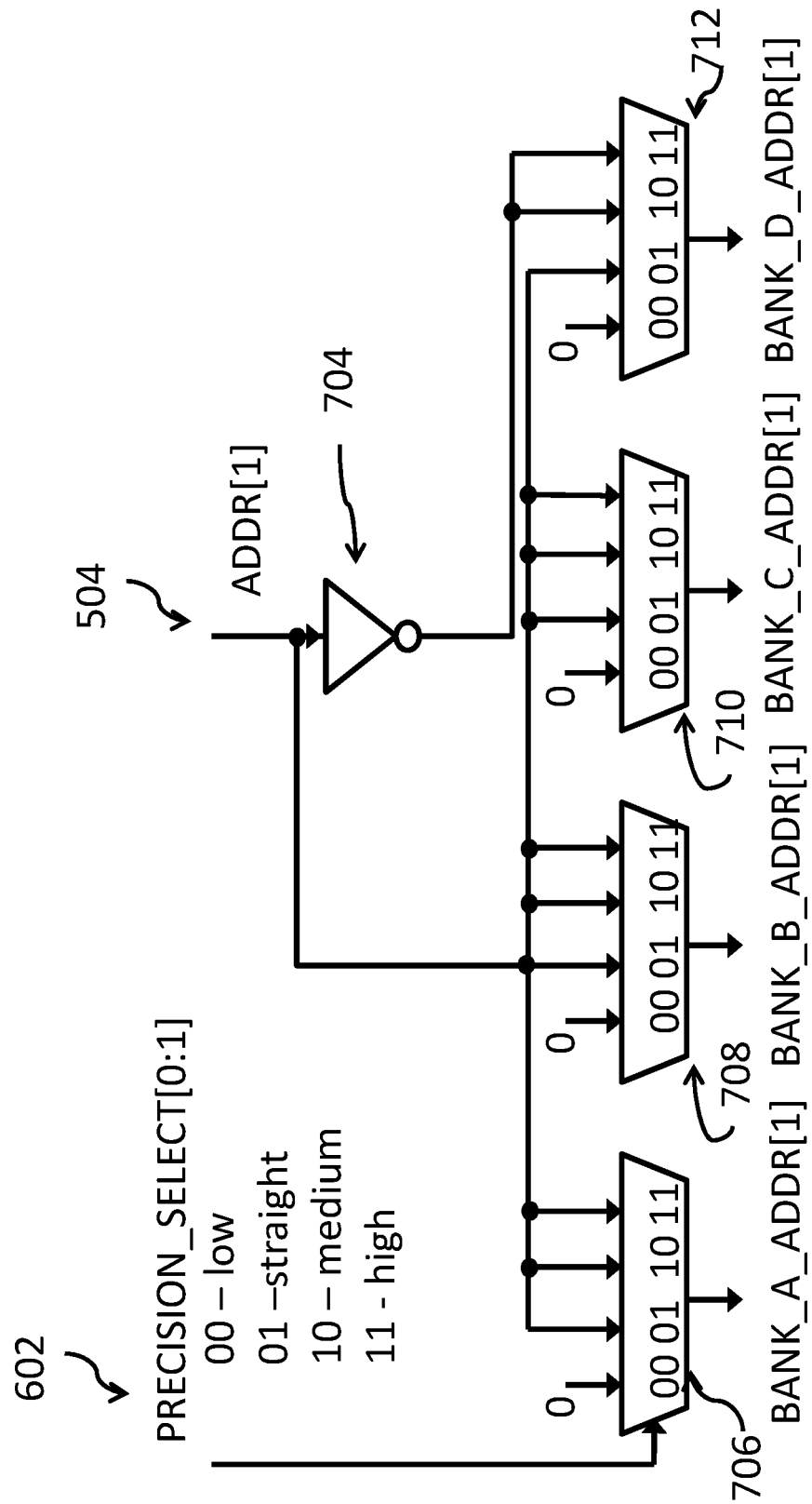

FIGS. 6 and 7 show embodiments of an implementation of the addressing schema of FIG. 5 with electronic components. FIG. 6 shows electronic components for one of the two address LSBs 506 (compare FIG. 5) and a precision select signal 602. The bank address bit signals BANK-A-ADDR[0], BANK-B-ADDR[0], BANK-C-ADDR[0] and BANK-D-ADDR[0] can be generated using the inverter 604 and the four MUXes 606, 608, 610, 612 wired in the way shown.

FIG. 7 shows an equivalent wiring diagram for the left bit 504 of the two LSBs of address bits 502. Additionally, also here the precision select signal 602 is used as input. Also here, an inverter 704 and four MUXes 706, 708, 710, 712 are wired in a way to generate the bank address bit signals BANK-A-ADDR[1], BANK-B-ADDR[1], BANK-C-ADDR[1] and BANK-D-ADDR[1] in a proper way, according to FIG. 5.

Figure 8:
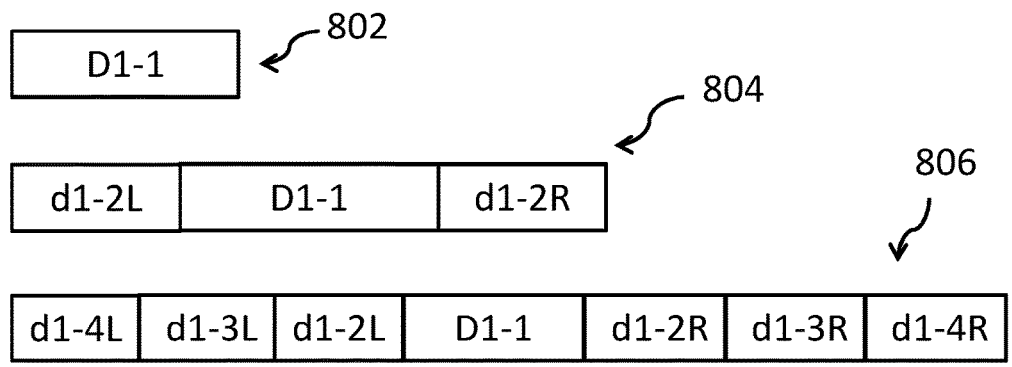
FIGS. 8 and 9 show a block diagram with a different composition of a base word and delta words.
Figure 9:
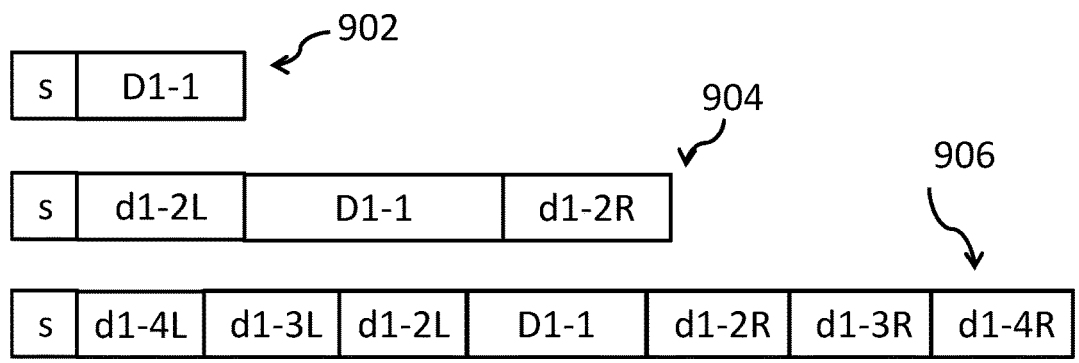

FIGS. 8 and 9 show a block diagram with a different composition of a base word and delta words. Base word D1-1 802 can have a split delta word on the left side as d1-2L as MSBs to base word 802 and on the right side as d1-2R as LSBs, as shown as 804. Block 806 shows base word D1-1 802 with the additional delta words or parts thereof d1-4L, d1-3L, d1-2L on the left side and d1-2R, d1-3R, d1-4 R on the right side. Other compositions and weightings of delta word elements on the left and on the right side can be possible.

A special case is a signed data word, as shown in 902, wherein the "s" indicates the sign bit. In this case, the remaining data word has one bit less than the typical data word width. In such a case of a base word and one data word, half the delta word can be inserted between the sign bit and the remaining bits of base word D1-1; and the other half of the delta word can be added as LSBs to the base word on the right side; compare 904. In case of more than one data word, the additional delta words on the left side of the base word, FIGS. 8 and 9, can be added between the sign bit "s" and the base word and the remaining parts of the data words can be headed on the right side of base word D1-1, as shown as 906.

Figure 10:
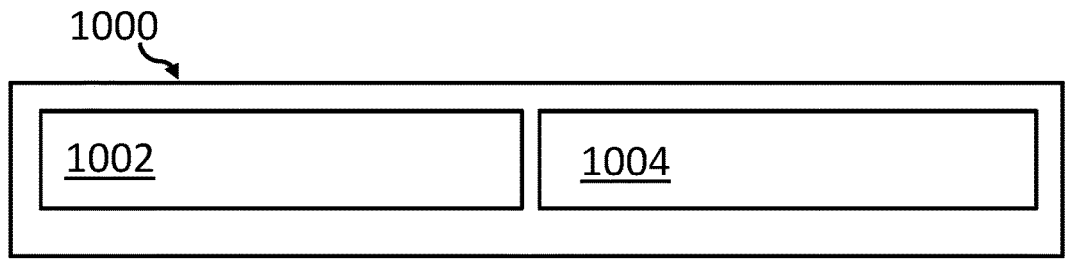
FIG. 10 shows an embodiment of the inventive memory controller.

FIG. 10 shows an embodiment of the inventive memory controller 1000 for storing and reading data elements to and from a memory. It can be equivalent to memory controller 402 from FIG. 4. Memory controller 1000 includes storage unit 1002 adapted for storing a data element as a base word in a first precision and for storing at least one delta word including additional information related to a second precision version of the stored data element and access unit 1004 adapted for reading the base word and the at least one delta word of the stored data element to access the data element in the second precision. It can be noted, that the functions of storage unit 1002 and access unit 1004 can be split among memory controller 404, controller 408 and shuffling unit 406.

Figure 11:
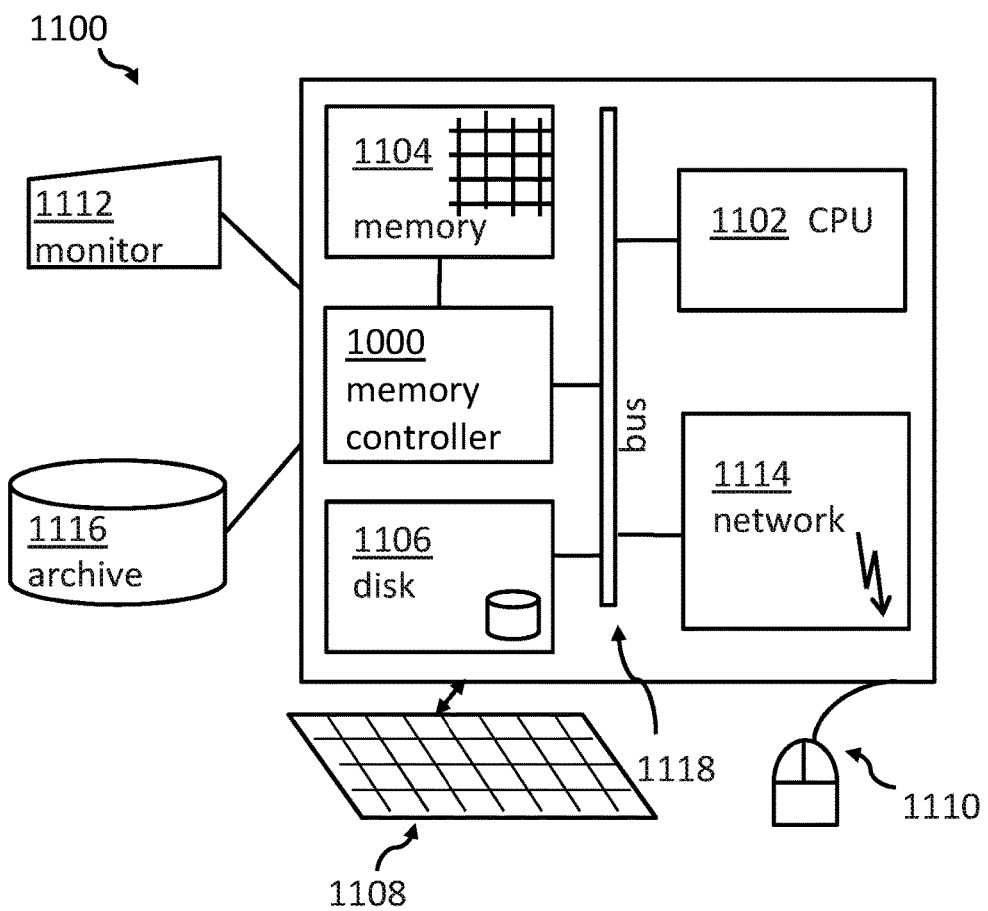
FIG. 11 shows an embodiment of a computer system including the memory controller.

Embodiments of the invention can be implemented together with virtually any type of computer, regardless of the platform being suitable for storing and/or executing program code. For example, as shown in FIG. 11, computing system 1100 can include at least one processor 1102 with at least one core per processor, associated memory elements 1104, internal storage device 1106 (e.g., a hard disk, an optical drive, such as a compact disk drive or digital video disk (DVD) drive, a flash memory stick, a solid-state disk, etc.), and numerous other elements and functionalities, typical of today's computers (not shown). Memory elements 1104 can include a main memory, e.g., a random access memory (RAM), employed during actual execution of the program code, and a cache memory, which can provide temporary storage of at least some program code and/or data in order to reduce the number of times, code and/or data must be retrieved from a long-term storage medium or external bulk storage 1116 for an execution. Elements inside computer 1100 can be linked together by means of a bus system 1118 with corresponding adapters. Additionally, memory controller 1000 can be linked between the main memory and the bus system 518.

Computing system 1100 can also include input means such as a keyboard 1108, a pointing device such as mouse 1110, or a microphone (not shown). Alternatively, the computing system can be equipped with a touch sensitive screen as main input device. Furthermore, computer 1100, can include output means such as a monitor or screen 1112 [e.g., a liquid crystal display (LCD), a plasma display, a light emitting diode display (LED), or cathode ray tube (CRT) monitor]. Computer system 1100 can be connected to a network [e.g., a local area network (LAN), a wide area network (WAN)], such as the Internet or any other similar type of network, including wireless networks via a network interface connection 1114. This can allow a coupling to other computer systems, or a storage network, or a tape drive. Those, skilled in the art will appreciate that many different types of computer systems exist, and the aforementioned input and output means can take other forms. Generally speaking, computer system 1100 can include at least the minimal processing, input and/or output means, necessary to practice embodiments of the invention.

While the invention has been described with respect to a limited number of embodiments, those skilled in the art, having benefit of this disclosure, will appreciate that other embodiments can be devised, which do not depart from the scope of the invention, as disclosed herein. Accordingly, the scope of the invention should be limited only by the attached claims. Also, elements described in association with different embodiments can be combined. It should also be noted that reference signs in the claims should not be construed as limiting elements.

As will be appreciated by one skilled in the art, aspects of the present disclosure can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in at least one computer readable medium having computer readable program code embodied thereon.

Any combination of at least one computer readable medium can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store, a program for use, by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present invention can be written in any combination of at least one programming language, including an object oriented programming language such as Java, Smalltalk, C++, or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams can represent a module, segment, or portion of code, which includes at least one executable instruction for implementing the specified logical function(s). It should also be noted that, in some alternative implementations, the functions, discussed hereinabove, can occur out of the disclosed order. For example, two functions taught in succession can, in fact, be executed substantially concurrently, or the functions can sometimes be executed in the reverse order depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of at least one other feature, integer, step, operation, element, component, and/or group thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A memory controller for storing and reading data elements to and from a memory, the memory controller comprising:
   a storage unit configured to store a data element as a base word in a first precision and for storing one or more delta words comprising additional information related to a second precision version of the stored data element, wherein:
   the data element and each of the one or more delta words is stored in a separate memory bank, and
   the separate memory banks facilitate the one or more delta words to be read with the base word from the separate memory banks during a single processor cycle; and
   the memory controller further comprising an access unit configured to read:
   the base word and the one or more delta words of the stored data element to access the data element in the second precision; and
   a second base word and a second set of one or more delta words of a second stored data element;
   wherein:
   the reading of the base word and delta words of the stored data element and the second stored data element occurs during a single processor cycle;
   the storage unit is further configured to store one or more delta words comprising additional information related to a third precision version of the stored data element;
   the second precision is higher than the first precision and the third precision is higher than the second precision;
   the access unit is further configured to read the base word, the one or more delta words comprising additional information related to the second precision, and the one or more delta words comprising additional information related to the third precision to access the data element in the third precision;
   each of the base word and the delta words are a width of a central processing unit register of a computer system;
   the base word and each delta word are stored in different memory banks and read in parallel from the different memory banks;
   a precision select signal that is usable to address the different memory banks;
   the base word is a signed data word containing a sign bit;
   accessing the data element in the third precision comprises adding, by a shuffling unit of a memory controller, a first set of the delta words between the sign bit and the remaining bits of the base word and adding a second set of the delta words as least significant bits;
   the shuffling unit of the memory controller is further configured to split the data element into the base word and a specified precision;
   the reading of the base word and the one or more delta words of the stored data element, and the second base word and the second one or more delta words of the second stored data element comprises utilizing an addressing data element;
   the access unit comprises:
      a first set of address components connected to a least significant bit (LSB) of a bank select signal, the first set of address components comprising a first inverter and a first set of MUXes; and
      a second set of address components connected to a most significant bit (MSB) of the bank select signal, the second set of address components comprising a second inverter and a second set of MUXes;
   the memory controller is further configured to apply:
      the precision select signal to a first MUX of the first set of MUXes;
      the LSB of the bank select signal to each of the first set of MUXes and to an input of the first inverter, wherein an output of the first inverter is applied to a first subset that does not include the first MUX of the first set of MUXes;
      the precision select signal to a first MUX of the second set of MUXes; and
      the MSB of the bank select signal to each of the second set of MUXes and to an input of the second inverter;
   wherein:
      an output of the second inverter is applied to a second MUX of the second set of MUXes; and
      the second MUX of the second set of MUXes is different than the first MUX of the second set of MUXes.

2. A computer system comprising a memory controller, the memory controller comprising:
   a storage unit configured to store a data element as a base word in a first precision and for storing one or more delta words comprising additional information related to a second precision version of the stored data element, wherein:
   the data element and each of the one or more delta words is stored in a separate memory bank, and
   the separate memory banks facilitate the one or more delta words to be read with the base word from the separate memory banks during a single processor cycle; and
   the memory controller further comprising an access unit configured to read:
   the base word and the one or more delta words of the stored data element to access the data element in the second precision; and
   a second base word and a second set of one or more delta words of a second stored data element;
   wherein:
   the reading of the base word and delta words of the stored data element and the second stored data element occurs during a single processor cycle;
   the storing unit is further configured to store one or more delta words comprising additional information related to a third precision version of the stored data element;
   the second precision is higher than the first precision and the third precision is higher than the second precision;
   the access unit is further configured to read the base word, the one or more delta words comprising additional information related to the second precision, and the one or more delta words comprising additional information related to the third precision to access the data element in the third precision;
   each of the base word and the delta words are a width of a central processing unit register of a computer system;

the base word and each delta word are stored in different memory banks and read in parallel from the different memory banks;
a precision select signal that is usable to address the different memory banks;
the base word is a signed data word containing a sign bit;
accessing the data element in the third precision comprises adding, by a shuffling unit of a memory controller, a first set of the delta words between the sign bit and the remaining bits of the base word and adding a second set of the delta words as least significant bits;
the shuffling unit of the memory controller is further configured to split the data element into the base word and a specified precision;
the reading of the base word and the one or more delta words of the stored data element, and the second base word and the second one or more delta words of the second stored data element comprises utilizing an addressing data element;
the access unit comprises:
 a first set of address components connected to a least significant bit (LSB) of a bank select signal, the first set of address components comprising a first inverter and a first set of MUXes; and
 a second set of address components connected to a most significant bit (MSB) of the bank select signal, the second set of address components comprising a second inverter and a second set of MUXes;
the memory controller is further configured to apply:
 the precision select signal to a first MUX of the first set of MUXes;
 the LSB of the bank select signal to each of the first set of MUXes and to an input of the first inverter, wherein an output of the first inverter is applied to a first subset that does not include the first MUX of the first set of MUXes; and
 the precision select signal to a first MUX of the second set of MUXes; and
 the MSB of the bank select signal to each of the second set of MUXes and to an input of the second inverter;
wherein:
 an output of the second inverter is applied to a second MUX of the second set of MUXes; and
 the second MUX of the second set of MUXes is different than the first MUX of the second set of MUXes.

3. A computer program product comprising non-transitory computer readable program means for causing a computer to perform a method for storing and reading data elements to and from a memory when the program means is run on the computer, the method comprising:
 storing a data element as a base word in a first precision;
 storing one or more delta words comprising additional information related to a second precision version of the stored data element,
wherein:
 the data element and each of the one or more delta words is stored in a separate memory bank,
 the separate memory banks facilitate the one or more delta words to be read with the base word from the separate memory banks during a single processor cycle;
the method further comprising:
 reading the base word and the one or more delta words of the stored data element to access the data element in the second precision;
 reading a second base word and a second set of one or more delta words of a second stored data element, wherein the reading of the base word and delta words of the stored data element and the second stored data element occurs during a single processor cycle;
 storing one or more delta words comprising additional information related to a third precision version of the stored data element,
wherein:
 the second precision is higher than the first precision and the third precision is higher than the second precision;
 the reading the base word, the one or more delta words comprising additional information related to the second precision, and the one or more delta words comprises additional information related to the third precision to access the data element in the third precision;
 each of the base word and the delta words are a width of a central processing unit register of a computer system;
 the base word and each delta word are stored in different memory banks and read in parallel from the different memory banks;
 a precision select signal that is usable to address the different memory banks, and wherein the base word is a signed data word containing a sign bit;
 accessing the data element in the third precision comprises adding, by a shuffling unit of a memory controller, a first set of the delta words between the sign bit and the remaining bits of the base word and adding a second set of the delta words as least significant bits; and
 the shuffling unit of the memory controller is further configured to split the data element into the base word and a specified precision
 the reading of the base word and the one or more delta words of the stored data element, and the second base word and the second one or more delta words of the second stored data element comprises utilizing an addressing data element;
 an access unit of the memory controller comprises:
  a first set of address components connected to a least significant bit (LSB) of a bank select signal, the first set of address components comprising a first inverter and a first set of MUXes; and
  a second set of address components connected to a most significant bit (MSB) of the bank select signal, the second set of address components comprising a second inverter and a second set of MUXes;
the method further comprising:
 applying the precision select signal to a first MUX of the first set of MUXes;
 applying the LSB of the bank select signal applied to each of the first set of MUXes and to an input of the first inverter, wherein an output of the first inverter is applied to a first subset that does not include the first MUX of the first set of MUXes;
 applying the precision select signal to a first MUX of the second set of MUXes; and
 applying the MSB of the bank select signal applied to each of the second set of MUXes and to an input of the second inverter;
wherein:
 an output of the second inverter is applied to a second MUX of the second set of MUXes; and
 the second MUX of the second set of MUXes is different than the first MUX of the second set of MUXes.

4. The computer program product according to claim 3, wherein the first precision is lower than the second precision.

5. The computer program product according to claim 3, wherein the data element is accessed in a precision between the precision of the base word and the second precision when a first subset of delta words of the one or more delta words are read from the memory.

6. The computer program product according to claim 3, wherein the base word and each delta word from the one or more delta words is stored in different memory banks.

7. The computer program product according to claim 3, wherein the one or more delta words are added as least significant bits to the base word.

8. The computer program product according to claim 3, wherein a first part of the delta words is added as most significant bits to the base word and a second part of the delta words is added as least significant bits.

9. The computer program product according to claim 3, wherein the data element is stored in a third precision using a different number of delta words than used for the second precision.

10. The computer program product according to claim 3, wherein:
the one or more delta words is one delta word;
each of the base word and the delta word are the width of a central processing unit register of a computer system;
the base word is a signed data word containing a sign bit;
the accessing of the data element in the second precision comprises adding, by a shuffling unit of a memory controller, a first half of the delta word between the sign bit and the remaining bits of the base word and adding, by a shuffling unit of a memory controller, a second half of the delta word as least significant bits.

11. The computer program product according to claim 3, wherein:
the splitting, by the shuffling unit of the memory controller, of the data element in the second precision into the base word and the one or more delta words;
the accessing of the data element in the second precision comprises reordering, by the shuffling unit of the memory controller, the base word and the one or more delta words into the data element in the second precision.

12. The computer program product of claim 3, wherein the data element is accessible in the first precision by reading only the base word.

13. The memory controller of claim 1, wherein:
each of the first set of MUXes comprises inputs connected to: two fixed-value signals and the LSB of the bank select signal;
each of the first subset of MUXes comprises an input connected to the output of the first inverter;
the second MUX comprises inputs connected to: one fixed-value signal and the MSB of the bank select signal; and
the second MUX comprises an input connected to the output of the second inverter.

14. The memory controller of claim 13, wherein:
the MSB of the bank select signal is connected to a plurality of inputs of each of the second set of MUXes except the second MUX.

15. The memory controller of claim 13, wherein:
the second MUX comprises a plurality of inputs connected to the output of the second inverter.

16. The computer system of claim 2, wherein:
each of the first set of MUXes comprises inputs connected to: two fixed-value signals and the LSB of the bank select signal;
each of the first subset of MUXes comprises an input connected to the output of the first inverter;
the second MUX comprises inputs connected to: one fixed-value signal and the MSB of the bank select signal; and
the second MUX comprises an input connected to the output of the second inverter.

17. The computer system of claim 16, wherein:
the MSB of the bank select signal is connected to a plurality of inputs of each of the second set of MUXes except the second MUX.

18. The computer system of claim 16, wherein:
the second MUX comprises a plurality of inputs connected to the output of the second inverter.

19. The computer program product of claim 3, wherein:
each of the first set of MUXes comprises inputs connected to: two fixed-value signals and the LSB of the bank select signal;
each of the first subset of MUXes comprises an input connected to the output of the first inverter;
the second MUX comprises inputs connected to: one fixed-value signal and the MSB of the bank select signal; and
the second MUX comprises an input connected to the output of the second inverter.

20. The computer program product of claim 19, wherein:
the MSB of the bank select signal is connected to a plurality of inputs of each of the second set of MUXes that except the second MUX; and
the second MUX comprises a plurality of inputs connected to the output of the second inverter.

* * * * *